United States Patent
Gu

(10) Patent No.: US 7,123,085 B2
(45) Date of Patent: Oct. 17, 2006

(54) RAIL-TO-RAIL CHARGE PUMP WITH REPLICA CIRCUITRY

(75) Inventor: Richard Gu, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 87 days.

(21) Appl. No.: 10/940,375

(22) Filed: Sep. 14, 2004

(65) Prior Publication Data

US 2006/0055451 A1    Mar. 16, 2006

(51) Int. Cl.
G05F 1/02 (2006.01)
H03L 7/093 (2006.01)

(52) U.S. Cl. ............... 327/590; 327/67; 327/157

(58) Field of Classification Search .......... 327/67, 327/87, 112, 157, 437, 484, 519, 520, 560, 327/576, 590; 326/83, 89
See application file for complete search history.

(56) References Cited

U.S. PATENT DOCUMENTS 6,172,571 B1 * 1/2001 Moyal et al. ............. 331/11
6,727,735 B1 * 4/2004 Park ........................ 327/157
6,952,126 B1 * 10/2005 Byun et al. ............... 327/157

* cited by examiner

Primary Examiner—Timothy P. Callahan
Assistant Examiner—Terry L. Englund
(74) Attorney, Agent, or Firm—Alan K. Stewart; W. James Brady; Frederick J. Telecky, Jr.

(57) ABSTRACT

The charge pump circuit includes: a charge pump output branch having a first transistor and a second transistor coupled in series; an output branch replica having a third transistor and a fourth transistor coupled in series; a feedback circuit coupled between the output branch and the output branch replica; a charge pump input circuit coupled to the charge pump output branch, and having first and second input branches; and an input circuit branch replica controlled by the feedback circuit and coupled to the charge pump input circuit.

12 Claims, 1 Drawing Sheet

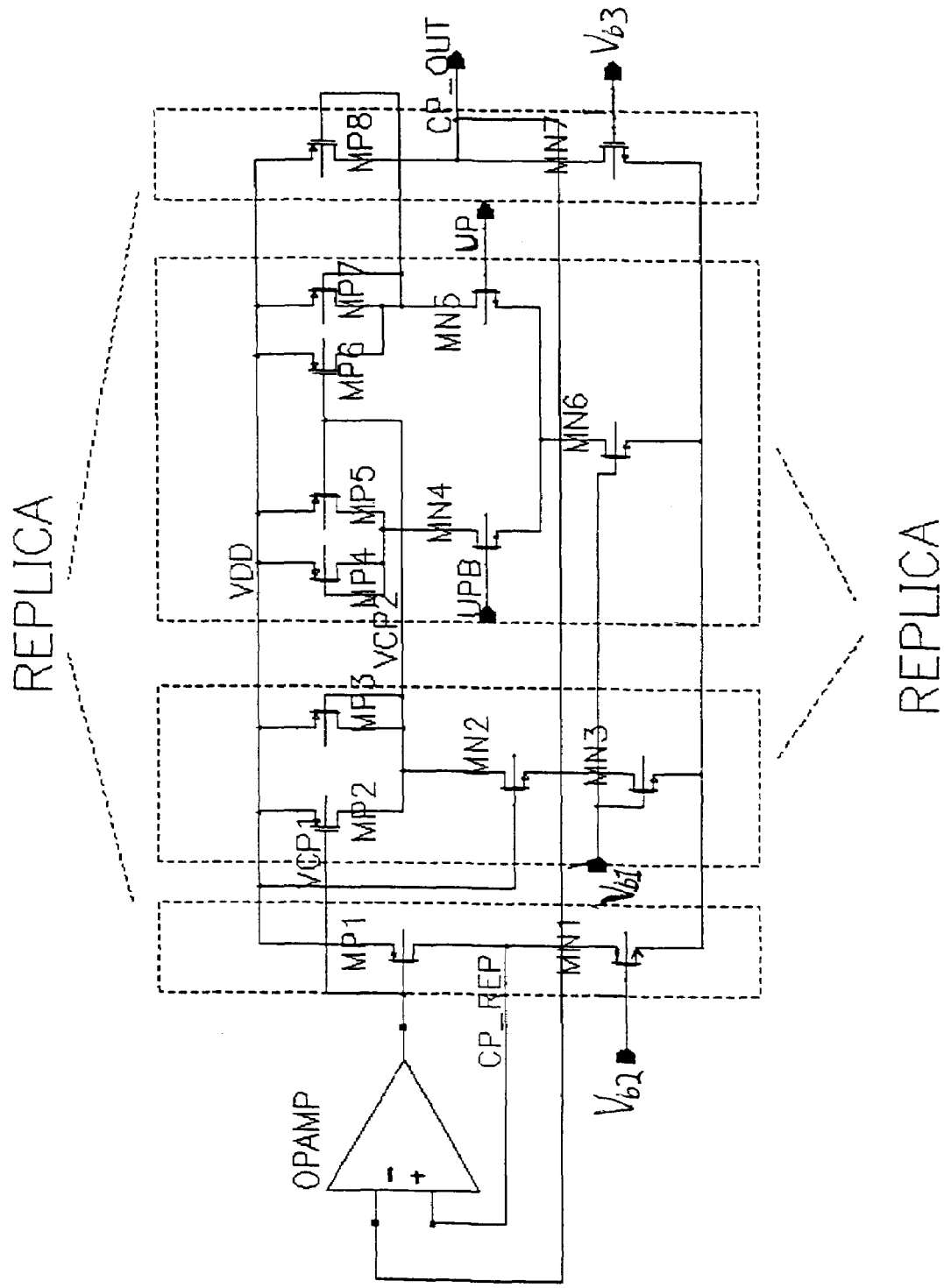

RAIL-TO-RAIL CHARGE PUMP WITH REPLICA CIRCUITRY

FIELD OF THE INVENTION

The present invention relates to electronic circuitry and, in particular, to a rail-to-rail charge pump with replica circuitry.

BACKGROUND OF THE INVENTION

With the scaling down of supply voltage of CMOS technology, voltage headroom gets less and less. It severely affects the operation of analog circuits. For example, in LCVCO (VCO formed with inductor (L) and varactor (C)) phase locked loop (PLL) design, varactor current-voltage (C-V) relation is not scaled with voltage. However, control voltage is scaled down with supply voltage. This results in severely reduced tuning range of the PLL.

SUMMARY OF THE INVENTION

A charge pump circuit includes: a charge pump output branch having a first transistor and a second transistor coupled in series; an output branch replica having a third transistor and a fourth transistor coupled in series; a feedback circuit coupled between the output branch and the output branch replica; a charge pump input circuit coupled to the charge pump output branch, and having first and second input branches; and an input circuit branch replica controlled by the feedback circuit and coupled to the charge pump input circuit.

BRIEF DESCRIPTION OF THE DRAWINGS

In the drawings:

The drawing is a circuit diagram of a preferred embodiment charge pump with replica circuitry.

DETAILED DESCRIPTION OF PREFERRED EMBODIMENTS

A rail-to-rail charge pump design is described according to the present invention. A replica charge pump is used to improve the charge pumps operation up to the supply voltage. A preferred embodiment charge pump circuit schematic is shown in the drawing. Transistors MP8 and MN7 provide the charge pump output. Transistors MN4 and MN5 are input devices which are driven by phase-frequency detector (PFD) signals UP and UPB. Transistor MN6 is a current source. Transistors MP4, MP5, MP6, and MP7 are balanced loading which generates a CML pulse to transistor MP8. The drains of transistors MP8 and MN7 form the charge pump output (CP_OUT). Voltages $V_{b1}$, $V_{b2}$ and $V_{b3}$ are bias voltages.

The drawback is when output CP_OUT is high and CP_OUT−Vg_MP8>Vtp (where Vtp is threshold voltage of PMOS and Vg_MP8 is the gate voltage of transistor MP8), current in transistor MP8 is reduced. Thus, the charge pump current reduces and causes the PLL loop dynamics to change.

To solve this problem, replica circuitry is used to make a constant current even when CP_OUT is only 5 mV below supply voltage VDD.

Transistors MP1 and MN1 are the replica of transistors MP8 and MN7. Transistors MP2, MP3, MN2, and MN3 are the replica of transistors MP4, MP5, MP6, MP7, MN4, MN5, and MN6.

The purpose of amplifier OPAMP is to force voltage CP_REP equal to output CP_OUT. When output CP_OUT is high, voltage VCP1 is pulled down to keep a constant current flow in the branch formed by transistors MP1 and MN1. Because voltage VCP1 is pulled down, voltage VCP2 is pulled up because the sum of current in transistors MP2 and MP3 is constant. Because transistors MP2, MP3, MN2, and MN3 are the replica of transistors MP4, MP5, MP6, MP7, MN4, MN5, and MN6, the gate voltage of transistor MP8 (Vg_MP8) has the voltage swing of VDD to VCP1 when signals UP and UPB switch. This generates a constant current pulse to the PLL loop filter.

Thus, PLL loop dynamics remain the same when output CP_OUT is close to source voltage VDD. Thus, PLL tuning range is increased.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A charge pump circuit comprising:
   a charge pump output branch;
   an output branch replica;
   an input circuit coupled to the charge pump output branch;
   a feedback circuit coupled between the charge pump output branch and the output branch replica;
   an input circuit branch replica coupled to the input circuit and having a control node coupled to the feedback circuit; and
   wherein the feedback circuit comprises an amplifier having a first input coupled to an output of the charge pump output branch, a second input coupled to an output of the output branch replica, and an amplifier output coupled to a control node of the output branch replica and to the input circuit branch replica.

2. The charge pump circuit of claim 1 wherein the charge pump output branch comprises a first transistor coupled in series with a second transistor.

3. The charge pump circuit of claim 2 wherein the output branch replica comprises a third transistor coupled in series with a fourth transistor.

4. The charge pump circuit of claim 1 wherein the input circuit comprises:
   a first input transistor;
   a second input transistor; and
   a first current source coupled to the first and second input transistors.

5. The charge pump circuit of claim 4 wherein the input circuit further comprises:
   a first loading transistor coupled to the first input transistor and having a control node coupled to the input circuit branch replica; and
   a second loading transistor coupled to the second input transistor and having a control node coupled to the control node of the first loading transistor.

6. The charge pump circuit of claim 5 wherein the input circuit further comprises:
   a third loading transistor coupled in parallel with the first loading transistor; and
   a fourth loading transistor coupled in parallel with the second loading transistor and having a control node coupled to the second input transistor and to a control node of the charge pump output branch.

7. The charge pump circuit of claim 6 wherein the input circuit branch replica comprises:
- a second current source having a control node coupled to a control node of the first current source;
- an input transistor replica coupled to the second current source;
- a fifth loading transistor coupled to the input transistor replica and having a control node coupled to the feedback circuit; and
- a sixth loading transistor coupled in parallel with the fifth loading transistor, and having a control node coupled to the input transistor replica and to the control node of the first loading transistor.

8. A charge pump circuit comprising:
- a charge pump output branch having a first transistor and a second transistor coupled in series;
- an output branch replica having a third transistor and a fourth transistor coupled in series;
- a feedback circuit coupled between the charge pump output branch and the output branch replica;
- a charge pump input circuit coupled to the charge pump output branch, and having first and second input branches;
- an input circuit branch replica controlled by the feedback circuit and coupled to the charge pump input circuit; and
- wherein the feedback circuit comprises an amplifier having a first input coupled to an output of the charge pump output branch, a second input coupled to an output of the output branch replica, and an amplifier output coupled to a control node of the third transistor and to the input circuit branch replica.

9. The charge pump circuit of claim 8 wherein the charge pump input circuit comprises:
- a first input transistor of the first input branch;
- a second input transistor of the second input branch; and
- a first current source coupled to the first and second input transistors.

10. The charge pump circuit of claim 9 wherein the charge pump input circuit further comprises:
- a fifth transistor coupled to the first input transistor and having a control node coupled to the input circuit branch replica; and
- a sixth transistor coupled to the second input transistor and having a control node coupled to the control node of the fifth transistor.

11. The charge pump circuit of claim 10 wherein the charge pump input circuit further comprises:
- a seventh transistor coupled in parallel with the fifth transistor; and
- an eighth transistor coupled in parallel with the sixth transistor and having a control node coupled to the sixth transistor and to the control node of the first transistor.

12. The charge pump circuit of claim 11 wherein the input circuit branch replica comprises:
- a second current source having a control node coupled to a control node of the first current source;
- an input transistor replica coupled to the second current source;
- a ninth transistor coupled to the input transistor replica and having a control node coupled to the feedback circuit; and
- a tenth transistor coupled in parallel with the ninth transistor and having a control node coupled to the input transistor replica and to the control node of the fifth transistor.

* * * * *